Figure 1:
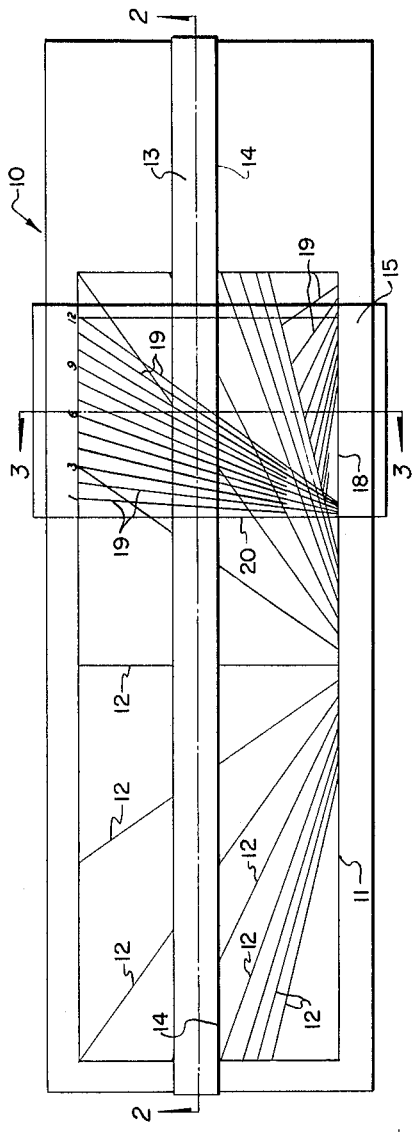

March 15, 1966     D. F. SAWYER ETAL     3,239,937
UNIVERSAL SCALE RULE DEVICE
Filed May 27, 1964     2 Sheets-Sheet 1

INVENTOR.
DAVID F. SAWYER
HOWARD L. LEAVITT
BY
*Mallinckrodt and Mallinckrodt*
ATTORNEYS

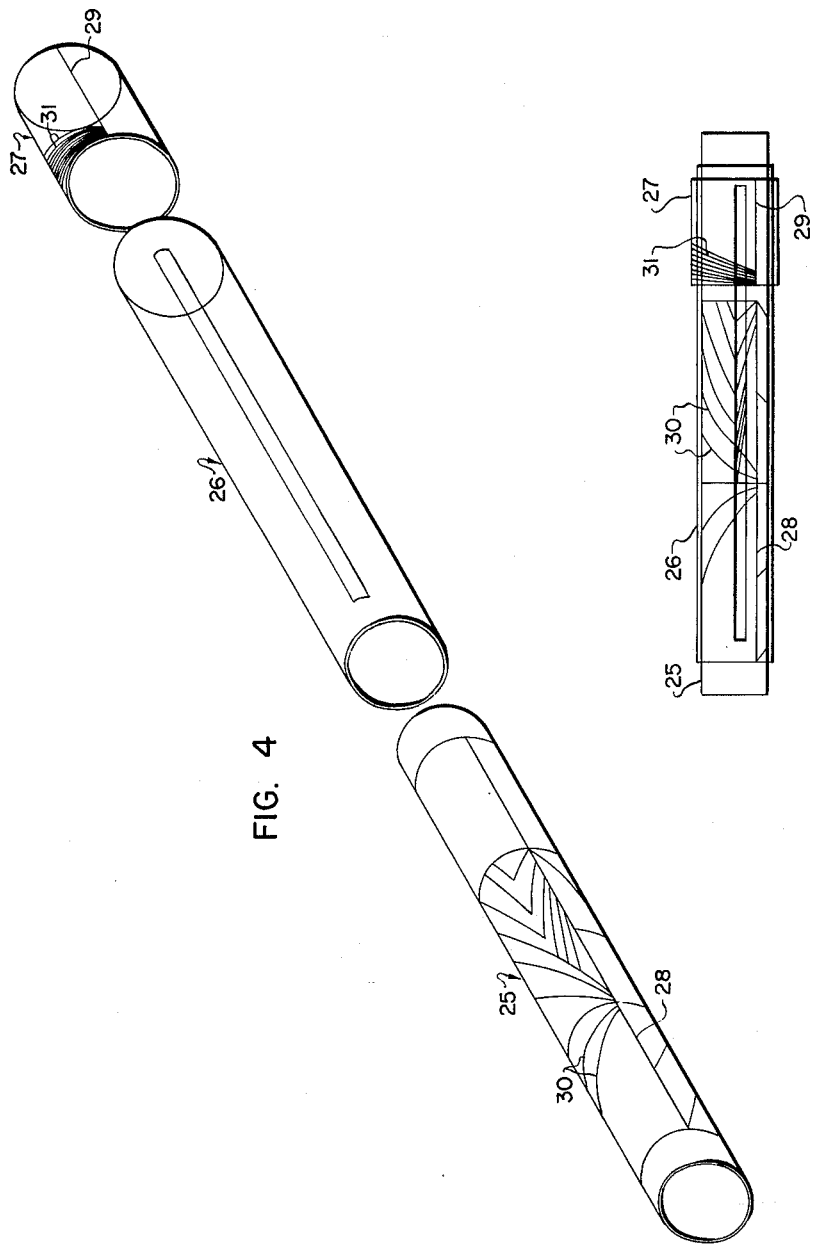

United States Patent Office 3,239,937
Patented Mar. 15, 1966

3,239,937
UNIVERSAL SCALE RULE DEVICE
David F. Sawyer and Howard L. Leavitt, Ogden, Utah, assignors to Marveon, Inc., Ogden, Utah, a corporation of Utah
Filed May 27, 1964, Ser. No. 370,634
10 Claims. (Cl. 33—64)

This invention relates to linear measuring devices, and is concerned with providing a device for enabling direct reading of unknown actual dimensions of objects illustrated by photographs or other pictorial or graphic representations when a known dimension is shown thereon, and for enabling direct reading of remote unknown dimensions viewed from a distance when a known dimension is also seen at substantially the same distance from the viewer.

Outdoor and electrical advertising sketch artists frequently need overall building dimensions to enable them to properly design and lay out neon signs and other advertising displays, and to estimate the costs and materials involved. In many instances, it is impractical to physically measure the building to obtain the required dimensions, and in the past they have relied primarily on estimates, the accuracy of which is highly questionable. In some cases the artists have employed photographs or other pictorial representations, and, by establishing the ratio of an actual dimension, such as a door width, to the illustrated door width, have determined other unknown actual dimensions with fairly good accuracy. However, this latter process is slow, requires trained persons to perform, and, since it involves a mathematical operation, is subject to frequent and excessive error.

Similar problems are encountered by construction estimators, military personnel, and others, who frequently must determine actual dimensions from direct viewing or from study of photo-maps or other pictorial or graphic representations.

Accordingly, it is a principal object of the present invention to provide a device that can be used to measure unknown actual dimensions of an object directly from a photograph or other graphic representation thereof when an actual dimension is known and is shown on the graphic representation, or directly from a remote point when both a known and the desired unknown dimensions are substantially the same distance from the viewer.

The device of the invention includes, as a basic component, a straight-edge rule having diverging scale lines worked thereon. A bar extends parallel with the straight-edge of the rule and is slidable over the scaled surface thereof. A transparent slide, having outwardly divergent, unit lines adapted to divide the distance between scale lines of the rule into equal units along a line of measurement and to establish the representative scale of the known distance, is mounted on the rule for sliding movement along the straight edge.

There are shown in the accompanying drawings specific embodiments of the invention representing what are presently regarded as the best modes of carrying out the generic concepts in actual practice. From the detailed descriptions of these presently preferred forms of invention, other more specific objects and features will become apparent.

Figure 2:
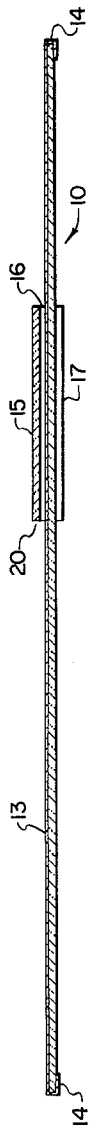
Figure 3:
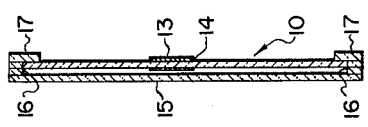

In the drawings:
FIG. 1 is a top plan view of one form of the invention;
FIG. 2, a vertical section taken on line 2—2 of FIG. 1;
FIG. 3, a similar view taken on line 3—3 of FIG. 1;
FIG. 4, an exploded perspective view of another embodiment; and
FIG. 5, a top plan view of the embodiment of FIG. 4.
Referring now to the drawing:

In the embodiment illustrated in FIGS. 1 and 2, the universal scale rule device includes a flat, transparent rule 10, of elongate rectangular configuration, although it will become apparent that other shapes can be employed.

A base line 11 extends parallel the bottom edge of the rectangular rule and scale lines 12 diverge upwardly therefrom. Scale lines 12 are equally spaced at their intersection with base line 11, and diverge outwardly such that they remain equidistant along any line of measurement taken parallel to the base line.

A bar 13, having a straight edge 14 parallel to base line 11 is mounted for sliding movement across the face of rule 10. The ends 14 of bar 13 are doubled back beneath the ends of the rule to serve as guides for bar movement and to maintain edge 14 parallel the base line.

A transparent slide 15 is mounted for sliding movement over both rule 10 and bar 13. Guideways 16, formed by flanges 17 engage the top and bottom edges of rule 10 and insure straight travel of slide 15.

Another base line 18 is provided on slide 15, and as the slide is moved across the face of the rule this base line overlies the base line on the rule. Unit lines 19 diverge away from base line 18, and with the leading edge 20 of the slide, serve to equally divide the distance between diverging lines 12 along their base line 11 and along any line taken parallel to base line 11.

The number of divergent scale lines 12 used, and their spacing, is a matter of choice dependent upon such factors as the range of possible scales desired and the overall dimensions of the rule. The number of unit lines 19 will be dependent upon the type scale desired. For example, if measurements are desired where the base number 12 is conveniently employed, such as in measuring feet and inches, there will be provided sufficient unit lines to conveniently divide the diverging scale lines 12 into twelve equal parts, or some convenient fraction thereof, such as six. If a metric measurement, or measurement to the base number ten is desired, there will be provided sufficient unit lines to conveniently divide the diverging lines 12 into ten equal parts or into some convenient fraction thereof, such as five.

To use this embodiment of the universal scale rule device it is only necessary to place the rule and slide over the portion of the photograph or other graphic representation showing an actual known distance and then to move the rule and slide until the known distance representation is parallel the base line 18 on the slide and just fits within the unit diverging lines 19 indicative of the actual distance. This establishes the representative scale of the particular photograph or other graphic representation, regardless of whether or not it is a standard scale.

The bar is then moved until straight edge 14, which is parallel to base line 11, forms a continuation of the known distance representation. The slide is moved until its leading edge intersects the intersection of a diverging scale line 12 and straight edge 14 and direct readings are then made of any distance shown on the graphic representation.

In making the direct readings, it is only necessary to place the leading edge of the bar adjacent the unknown distance to be measured such that the distance falls between a diverging scale line 12 at one end and either another diverging scale 12 at the other end or such that the other end of the distance falls within the diverging unit lines 19 on the slide. The unknown distance can then be read directly, with the distance between adjacent diverging scale lines on the rule being equal to the total number of equally divided units formed by diverging lines 19.

Thus, when using the universal scale rule device illustrated in FIGS. 1 and 2 wherein the slide is graduated like a standard architect's scale, i.e., into units of twelve, the known distance would first be located such that it just fits between the leading edge of the slide and the diverging line defining the length. That is, if the known dimension was three feet in length, the slide would be positioned such that the graphic representation thereof would just fit between the leading edge of the slide and the divergent unit line marked "3" on the slide and would be parallel to the base lines 11 and 18. Bar 13 would then be moved up to form a continuation of the known distance line and to elongate the scale thus established. In making direct readings of unknown distances, the distance between adjacent diverging scale lines 12 is equal to twelve times the distance between the adjacent divering lines 19. Therefore, if the example above is continued and the rule is placed to directly read an unknown distance shown on the graphic representation, and, if the unknown distance extends from one divergent scale line 12 past two other scale lines 12 and then to the line marked "6" among divergent unit lines 19, the unknown distance can be correctly read as thirty feet.

FIGS. 3 and 4 show another embodiment of the invention wherein the universal scale is of cylindrical configuration. As in the previously described embodiment, the scale consists of three components, a rule 25, a bar 26, and a slide 27. In this case, however, rule 25 is made cylindrical and bar 26 and slide 27 are constructed as transparent sleeves that will slide over the rule. Base lines 28 and 29 and diverging scale lines 30 and unit lines 31 are provided on the rule and slide, respectively, in the manner previously described, except that the diverging lines extend from their respective base lines around the rule and slide, ending at the base line which extends lengthwise on the cylindrical members.

In this embodiment, the bar, although useful to provide a guide for elongating the scale established by locating a known distance on the slide, is not entirely necessary since the horizon of the cylindrical scale is parallel the base line and can be used as the extending line. Furthermore, since it is a simple matter to hold the rule, guide, and slide such that the user can look directly over them to both a known and an unknown distance, this embodiment of the rule can be readily used to measure distances viewed directly, and is not limited to establishing scales for graphic representations.

For example, an architect or outdoor advertising salesman can merely look at a building over the horizon formed by holding the cylindrical scale laterally at eye level, and then by rotating the rule and slide, position a known distance on the front of the building, such as a door having a standard three foot width, between the appropriate diverging unit lines on the slide to determine the viewing scale. By moving the base line on the rule into alignment with the base line on the slide and moving the slide laterally until its leading edges passes through the intersection of a diverging scale line on the rule and the line formed by the horizon of the scale, or a line on a bar, if one is used, the determined scale is extended and can be used to measure unknown distances. The length of the entire building front can now be read directly along the same horizon line (or the line on the bar if a bar is used) or the length of any portion of the building front can be easily ascertained. It should be obvious, however, that in order to obtain substantially accurate readings, the user's position must be fixed for all readings made using any one determined scale and that the distance from the user's eye to the scale should be maintained as constant as possible for all readings.

Readings are made from the cylindrical scale rule device in the same manner they are made from the previously described flat scale rule device. That is, in making readings, the distance between each pair of diverging scale lines 30 on the rule is equal to the number of equally divided units formed by the diverging lines 31 on the slide.

We claim:

1. A device for determining unknown actual distances from graphic representations or direct viewing thereof, comprising a straight-edge rule; a base line on said rule; scale lines on said rule diverging outwardly from said base line, said scale lines being spaced equidistant along said base line and being equidistant along any intersecting line parallel to said base line; a slide; a base line on said slide; means mounting said slide for reciprocating movement over said rule such that the base line on said slide overlies the base line on the rule; unit lines on said slide diverging outwardly from the slide base line, said diverging unit lines being spaced equidistant along the slide base line and along any line parallel thereto and being spaced to equally sub-divide the base line distance between adjacent diverging scale lines.

2. The device for determining distances according to claim 1, further including a bar having a line parallel the base lines on the rule and slide; and means mounting said bar for movement over said rule such that the line remains parallel to the base lines.

3. The device for determining distances according to claim 2, wherein the rule is flat and transparent, and wherein the slide is transparent.

4. The device for determining distances according to claim 1, wherein the rule is of cylindrical configuration.

5. The device for determining distances according to claim 4, wherein the rule is cylindrical; the bar includes a sleeve surrounding the rule; and the slide is transparent and includes a sleeve surrounding said rule and bar.

6. The device for determining distances according to claim 1, wherein the unit diverging lines on the slide sub-divide the spaces between the diverging lines on the rule into twelve equal units.

7. The device for determining distances according to claim 1, wherein the unit diverging lines on the slide sub-divide the spaces between the diverging lines on the rule into ten equal units.

8. A device for determining unknown actual distances from graphic representations thereof when an actual distance is known and is shown on the graphic representation comprising a transparent straight-edge rule; a base line on said rule; scale lines on said rule diverging outwardly from said base line, said scale lines being spaced equidistant along said base line and being equidistant along any intersecting line parallel to said base line; a transparent slide; means mounting said slide for movement over said rule; a base line on said slide, said base line being positioned to overlie the base line on the rule as said slide is moved over said rule; unit lines on said slide diverging outwardly from said base line, said unit lines being spaced equidistant along the slide base line and along any line parallel thereto, and said divering unit lines on the slide being more closely spaced than the spacing of the diverging scale lines on the rule such that as the slide is moved over the rule they sub-divide the base line distance between adjacent diverging scale lines on the rule; a bar having an edge extending parallel to the base lines on the rule and slide; and means mounting said bar for sliding movement over said rule in a direction normal to the direction of travel of the slide.

9. The device for determining distances according to claim 8, wherein the diverging unit lines on the slide sub-divided the spaces between the diverging lines on the rule into twelve units.

10. The device for determining distances according to claim 8, wherein the diverging unit lines on the slide sub-divide the spaces between the diverging lines on the rule into ten units.

References Cited by the Examiner

UNITED STATES PATENTS

| | | | |
|---|---|---|---|
| 1,383,492 | 7/1921 | Seely | 235—89 |
| 2,300,448 | 11/1942 | Ludwig | 33—158 X |
| 2,495,777 | 1/1950 | Schroeder | 235—61 |

LOUIS R. PRINCE, *Primary Examiner.*